US012342946B2

(12) United States Patent
Zhang (10) Patent No.: US 12,342,946 B2
(45) Date of Patent: *Jul. 1, 2025

(54) FOLDABLE MECHANISM AND INFANT CARRIER THEREOF

(71) Applicant: Wonderland Switzerland AG, Steinhausen (CH)

(72) Inventor: Chengkai Zhang, Steinhausen (CH)

(73) Assignee: WONDERLAND SWITZERLAND AG, Steinhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/373,290

(22) Filed: Sep. 27, 2023

(65) Prior Publication Data

US 2024/0016310 A1    Jan. 18, 2024

Related U.S. Application Data

(63) Continuation of application No. 17/952,328, filed on Sep. 26, 2022, now Pat. No. 11,805,920, which is a
(Continued)

(30) Foreign Application Priority Data

Sep. 18, 2019    (CN) ......................... 201910882244.X (51) Int. Cl.
*A47D 1/02* (2006.01)
*A47D 1/00* (2006.01)
(Continued)

(52) U.S. Cl.
CPC ............. *A47D 1/023* (2017.05); *A47D 1/004* (2013.01); *A47D 1/008* (2013.01); *F16C 11/10* (2013.01);
(Continued)

(58) Field of Classification Search
None
See application file for complete search history.

(56) References Cited

U.S. PATENT DOCUMENTS 3,635,432 A    1/1972   Hollander
5,058,239 A   10/1991   Lee
(Continued)

FOREIGN PATENT DOCUMENTS

CN    202775326 U    3/2013
CN    103661544 A    3/2014
(Continued)

OTHER PUBLICATIONS

Chinese Application No. 201910882244X; Notice of Allowance with English translation dated Aug. 30, 2024; 14 pages.
(Continued)

*Primary Examiner* — Philip F Gabler
(74) *Attorney, Agent, or Firm* — CANTOR COLBURN LLP (57) ABSTRACT

A foldable mechanism is applied to locking an infant carrier and includes first and second mounts and a locking member. The second mount is pivoted to the first mount and has first and second mating portions. The locking member is movably disposed between the first and second mounts and is movable along an axial direction of a rotating axis of the first and second mounts to lock and release rotation of the first mount. The locking member has a positioning portion and a locking portion. The first mount is locked at a first rotating position or a second rotating position via movement of the locking member. The positioning portion is engaged with the first mating portion to lock the first mount at the first rotating position. The locking portion is engaged with the second mating portion to lock the first mount at the second rotating position.

18 Claims, 6 Drawing Sheets

Related U.S. Application Data continuation of application No. 17/023,404, filed on Sep. 17, 2020, now Pat. No. 11,484,129.

(51) Int. Cl.
  *F16C 11/10* (2006.01)
  *A47D 1/04* (2006.01)
  *A47D 13/02* (2006.01)

(52) U.S. Cl.
  CPC ............... *A47D 1/04* (2013.01); *A47D 13/02* (2013.01); *F16C 2314/73* (2013.01); *Y10T 403/32336* (2015.01); *Y10T 403/32361* (2015.01); *Y10T 403/32368* (2015.01)

(56) References Cited

U.S. PATENT DOCUMENTS

| | | | |
|---|---|---|---|
| 5,279,387 | A | 1/1994 | Swiderski |
| 5,765,958 | A | 6/1998 | Lan |
| 5,961,180 | A | 10/1999 | Greger |
| 6,089,653 | A | 7/2000 | Hotaling |
| 6,616,367 | B2 | 9/2003 | Cheng |
| 9,095,946 | B2 * | 8/2015 | Kotula ............... F16C 11/103 |
| 2003/0015892 | A1 | 1/2003 | Wu |
| 2003/0062709 | A1 | 4/2003 | Newhard |
| 2003/0077111 | A1 | 4/2003 | Cheng |
| 2005/0168023 | A1 | 8/2005 | Gangadharan |
| 2007/0194609 | A1 | 8/2007 | Chen |
| 2008/0079240 | A1 | 4/2008 | Yeh |
| 2010/0078916 | A1 | 4/2010 | Chen |
| 2014/0054938 | A1 | 2/2014 | Shan |
| 2015/0313375 | A1 | 11/2015 | Horst |
| 2016/0007766 | A1 | 1/2016 | Sack |
| 2017/0144687 | A1 | 5/2017 | Li et al. |
| 2019/0335916 | A1 | 11/2019 | Taylor |
| 2020/0128970 | A1 | 4/2020 | Pujol |
| 2023/0174244 | A1 | 6/2023 | Avenel |

FOREIGN PATENT DOCUMENTS

| | | |
|---|---|---|
| CN | 104816750 A | 8/2015 |
| CN | 106143575 A | 11/2016 |
| CN | 108068871 A | 5/2018 |
| CN | 108275190 A | 7/2018 |
| CN | 109131517 A | 1/2019 |
| DE | 102015102538 A1 | 8/2016 |
| EP | 2 433 524 A1 | 3/2012 |
| GB | 2495229 A | 4/2013 |
| GB | 2517288 A | 2/2015 |
| JP | 2010-201151 A | 9/2010 |
| WO | 2004/052710 A1 | 6/2004 |
| WO | 2016/165899 A1 | 10/2016 |
| WO | 2018077054 A2 | 5/2018 |

OTHER PUBLICATIONS

Chinese Application No. 201910882244X; 1st Office Action with English translation dated Sep. 20, 2023; 23 pages.

\* cited by examiner

FOLDABLE MECHANISM AND INFANT CARRIER THEREOF

CROSS REFERENCE TO RELATED APPLICATIONS

This application is a continuation application of U.S. application Ser. No. 17/952,328, filed on Sep. 26, 2022, which is a continuation application of U.S. application Ser. No. 17/023,404, filed on Sep. 17, 2020. The contents of these applications are incorporated herein by reference.

BACKGROUND OF THE INVENTION

1. Field of the Invention

The present invention relates to a foldable mechanism and an infant carrier thereof, and more specifically, to a foldable mechanism having a simple folding mechanical design for improving folding stability of an infant carrier.

2. Description of the Prior Art

For practicality and carrying convenience, an infant carrier usually has a foldable mechanism disposed thereon. As such, the infant carrier can be expanded completely in a use state or be folded to a compact size in a non-use state for storage or carrying convenience.

The aforesaid foldable mechanism is usually utilized to fold a front leg and a rear leg of a main frame of the infant carrier, and then lock the front leg and the rear leg in a folded state via a locking device disposed between the front leg and the rear leg.

SUMMARY OF THE INVENTION

A foldable mechanism includes a first mount, a second mount, and a locking member. The second mount is pivotally connected to the first mount. The second mount has a first mating portion and a second mating portion spaced apart from the first mating portion. The locking member is movably disposed between the first mount and the second mount. The locking member has a positioning portion and a locking portion. The first mount is locked at a first rotating position or a second rotating position via movement of the locking member. The positioning portion is engaged with the first mating portion to lock the first mount at the first rotating position, and the positioning portion is disengaged from the first mating portion to release the first mount. The locking portion is engaged with the second mating portion to lock the first mount at the second rotating position, and the locking portion is disengaged from the second mating portion to release the first mount.

An infant carrier of the present invention includes a main frame, a seat, and a foldable mechanism. The main frame includes a front leg and a rear leg. The seat is mounted on the main frame. The foldable mechanism includes a first mount, a second mount, and a locking member. The first mount is connected to one of the front leg and the rear leg. The second mount is connected to the other of the front leg and the rear leg and pivotally connected to the first mount to make the front leg pivotally connected to the rear leg. The second mount has a first mating portion and a second mating portion spaced apart from the first mating portion. The locking member is movably disposed between the first mount and the second mount. The locking member is movable along an axial direction of a rotating axis of the first mount and the second mount to lock and release rotation of the first mount relative to the second mount. The locking member has a positioning portion and a locking portion. The first mount is locked at a first rotating position or a second rotating position via movement of the locking member. The positioning portion is engaged with the first mating portion to lock the first mount at the first rotating position, and the positioning portion is disengaged from the first mating portion to release the first mount. The locking portion is engaged with the second mating portion to lock the first mount at the second rotating position, and the locking portion is disengaged from the second mating portion to release the first mount.

These and other objectives of the present invention will no doubt become obvious to those of ordinary skill in the art after reading the following detailed description of the preferred embodiment that is illustrated in the various figures and drawings.

DETAILED DESCRIPTION

The detailed description for preferred embodiments of the present invention is provided with attached drawings as follows.

Figure 1:
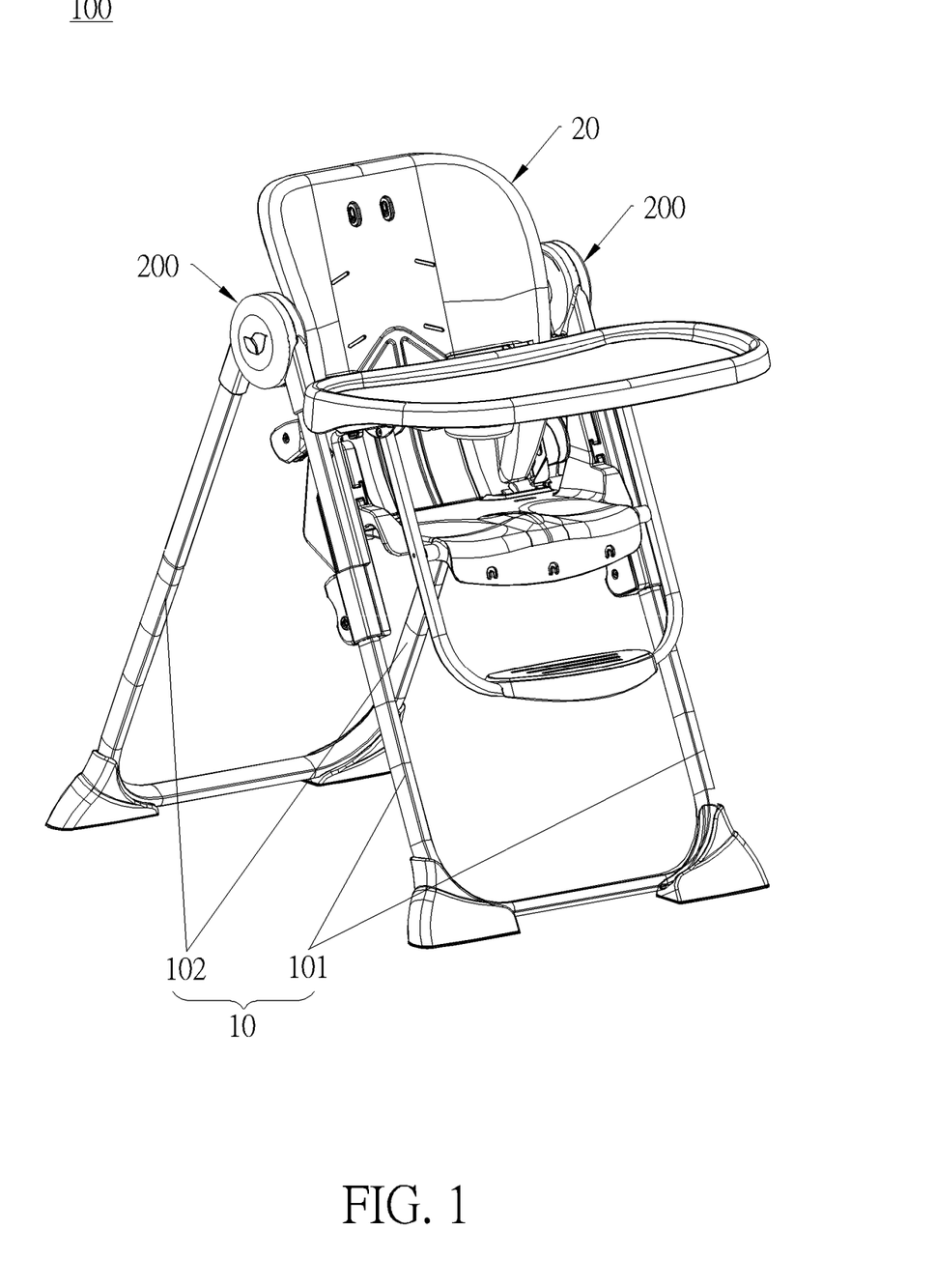
FIG. 1 is a diagram of an infant carrier being in an expanded state according to an embodiment of the present invention.
Figure 2:
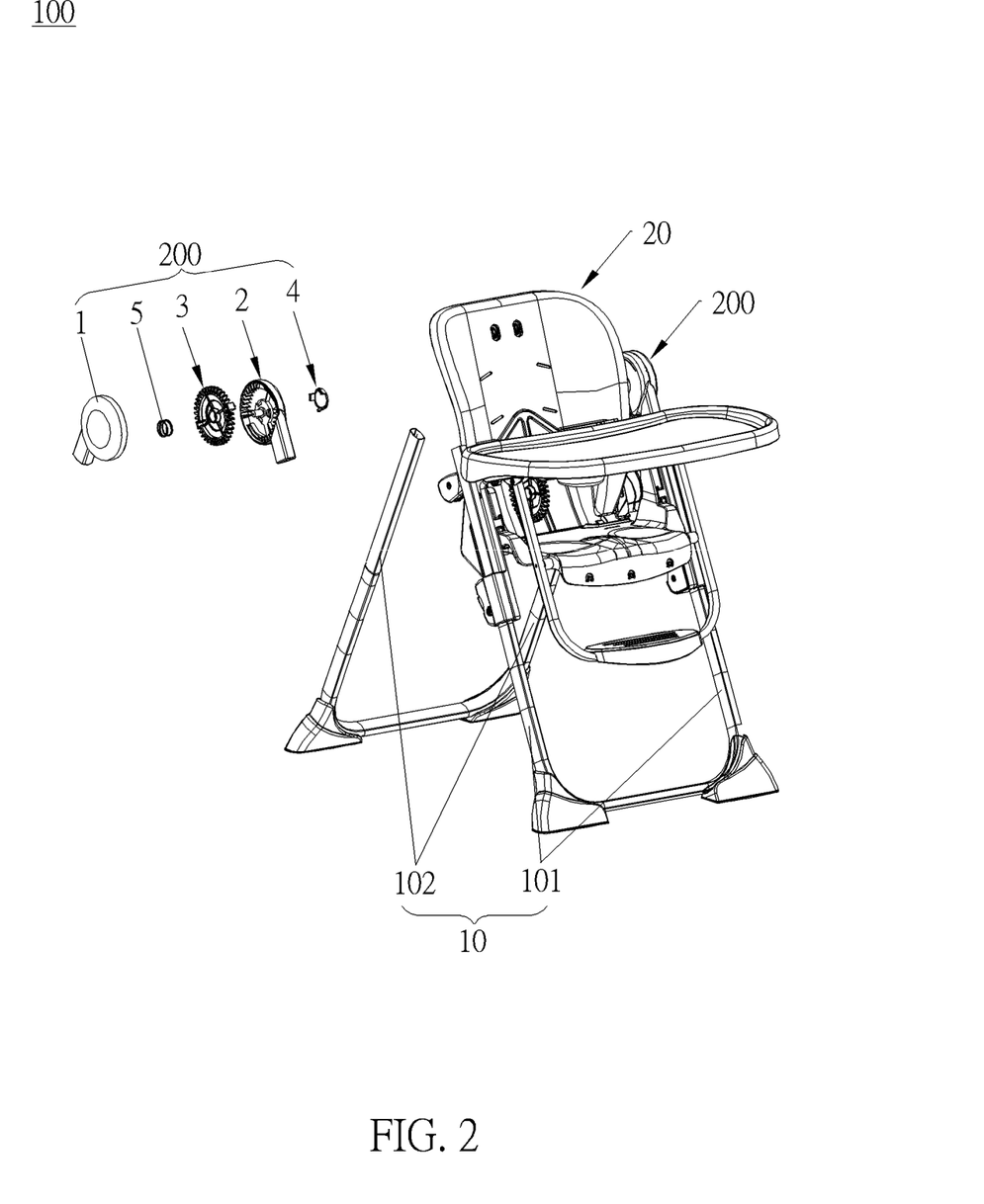
FIG. 2 is a partial exploded diagram of the infant carrier in FIG. 1.
Figure 3:
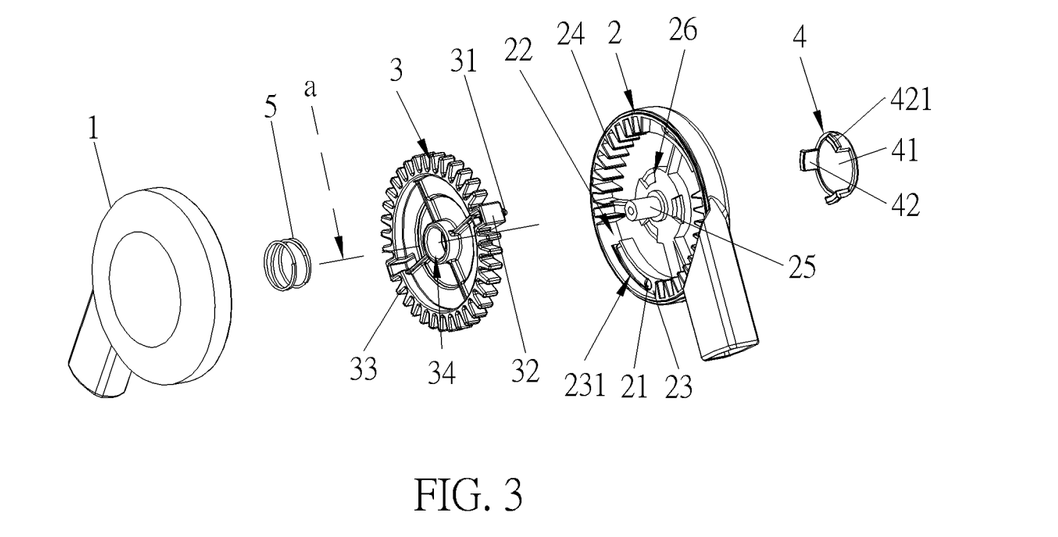
FIG. 3 is an exploded diagram of a foldable mechanism in FIG. 1 when a first mount rotates to a second rotating position relative to a second mount.

Please refer to FIGS. 1-3. An infant carrier 100 provided by the present invention is a high chair or a stroller (but not limited thereto). More detailed description for an embodiment that the infant carrier 100 is a high chair is provided as follows. The infant carrier 100 includes a main frame 10, a foldable mechanism 200 and a seat 20. The seat 20 is mounted on the main frame 10 for holding an infant. The main frame 10 includes a front leg 101 and a rear leg 102. The front leg 101 is pivotally connected to the rear leg 102 via the foldable mechanism 200 to be foldable or expandable relative to rear leg 102. The seat 20 can be folded together with folding of the front leg 101 relative to the rear leg 102. A height adjustment structure (not shown in the figures of the present invention) is disposed between the main frame 10 and the seat 20 for adjusting a height of the seat 20 relative to the main frame 10. There are two front legs 101, two rear legs 102, and two foldable mechanisms 200 disposed symmetrically on the main frame 10. The seat 20 is slidably disposed on the main frame 10 such that the height of the seat 20 relative to the main frame 10 can be adjusted via sliding of the seat 20. The height adjusting structure includes a protruding block and engaging slots mating with the protruding block. The protruding block is disposed on one of the seat 20 and the main frame 10, and the engaging slots are formed on the other of the seat 20 and the main frame 10. The engaging slots are spaced apart from each other. The protruding block is selectively engaged with one of the engaging slots to lock the height of the seat 20 relative to the main frame 10. In this embodiment, the protruding block is disposed on the seat 20 and the engaging slots are formed on the main frame 10 alternately, but the present invention is not limited thereto. The seat 20 is mounted between the two foldable mechanisms 200.

The foldable mechanism 200 includes a first mount 1, a second mount 2, and a locking member 3. The first mount 1 is pivotally connected to the second mount 2 and located at an external side of the second mount 2. The rear leg 102 is connected to the first mount 1 and the front leg 101 is connected to the second mount 2, so as to make the front leg 101 foldable relative to the rear leg 102. Preferably, the second mount 2 jackets the front leg 101 and the first mount 1 jackets the rear leg 102, but the present invention is not limited thereto. The locking member 3 can rotate together with the first mount 1 such that rotation of the first mount 1 relative to the second mount 2 can drive the locking member 3 to rotate relative to the second mount 2. In other words, the first mount 1 can be locked on the second mount 2 via the locking member 3. The first mount 1 can form a hollow cavity cooperatively with the second mount 2 after being pivoted to the second mount 2. The locking member 3 is movably disposed between the first mount 1 and the second mount 2 such that the locking member 3 can lock the first mount 1 on the second mount 2 or release the first mount 1 to be rotatable relative to the second mount 2. Preferably, a sliding shaft 25 extends from the second mount 2 toward the first mount 1, and the locking member 3 has a center hole 34 slidably mating with the sliding shaft 25. The sliding shaft 25 passes through the center hole 34 to make the locking member 3 rotatable relative to a rotating axis of the first mount 1 and the second mount 2 or movable along an axial direction of the rotating axis of the first mount 1 and the second mount 2 (the rotating axis is depicted as an arrow "a" in FIG. 3). Since the locking member 3 is movably disposed between the first mount 1 and the second mount 2, free rotation of the locking member 3 relative to the second mount 2 along the rotating axis can make the first mount 1 rotatable relative to the second mount 2 for adjusting a rotating position of the first mount 1 relative to the second mount 2. During the process of the locking member 3 moving along the axial direction of the rotating axis, the second mount 2 can be engaged with the locking member 3 for locking rotation of the locking member 3, so as to indirectly lock rotation of the first mount 1 relative to the second mount 2. In such a manner, rotation of the first mount 1 relative to the second mount 2 can be locked or released via rotation and axial movement of the locking member 3, so as to make the foldable mechanism 200 have a simple mechanical design and improve folding stability of the foldable mechanism 200. The present invention is not limited to the design that rotation of the first mount 1 relative to the second mount 2 is locked by movement of the locking member 3 along the aforesaid axial direction, meaning that the present invention could adopt the design that rotation of the first mount 1 relative to the second mount 2 is locked by movement of the locking member 3 in another direction. In another embodiment, the rear leg 102 could be connected to the second mount 2 and the front leg 101 could be connected to the first mount 1.

Figure 4:
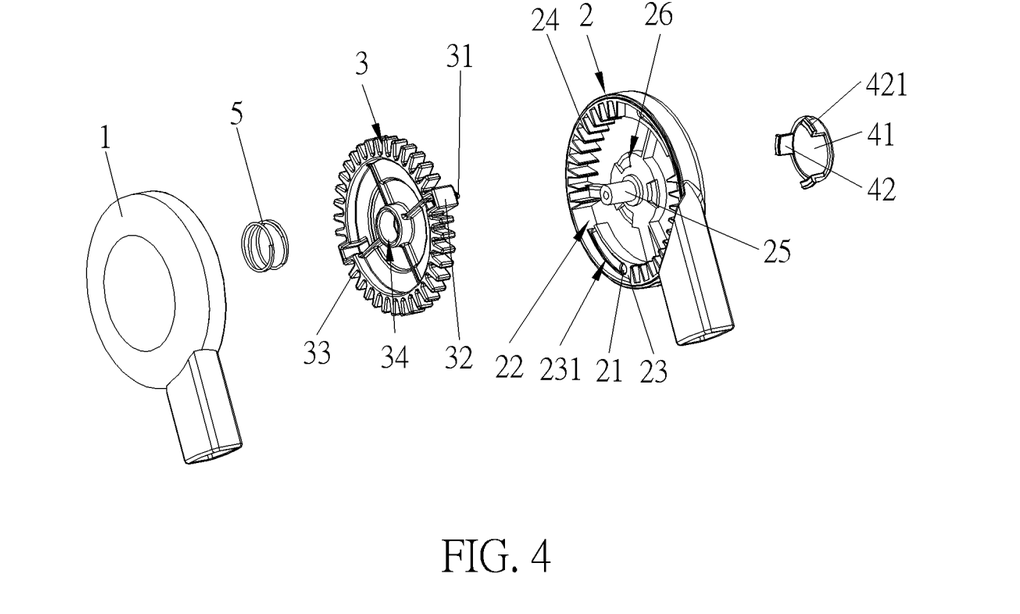
FIG. 4 is an exploded diagram of the foldable mechanism in FIG. 1 when the first mount rotates to a first rotating position relative to the second mount.
Figure 5:
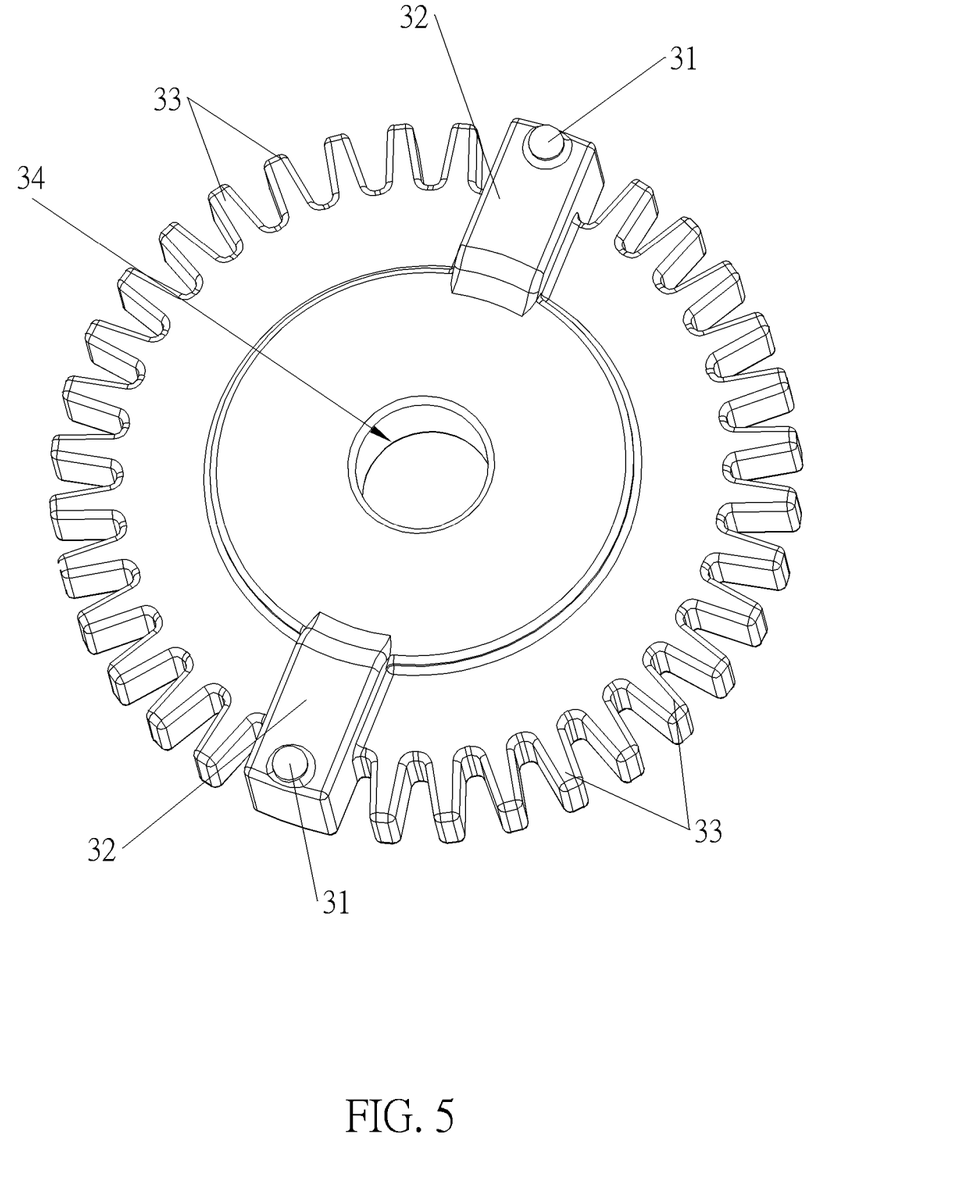
FIG. 5 is an enlarged diagram of a locking member in FIG. 2.
Figure 6:
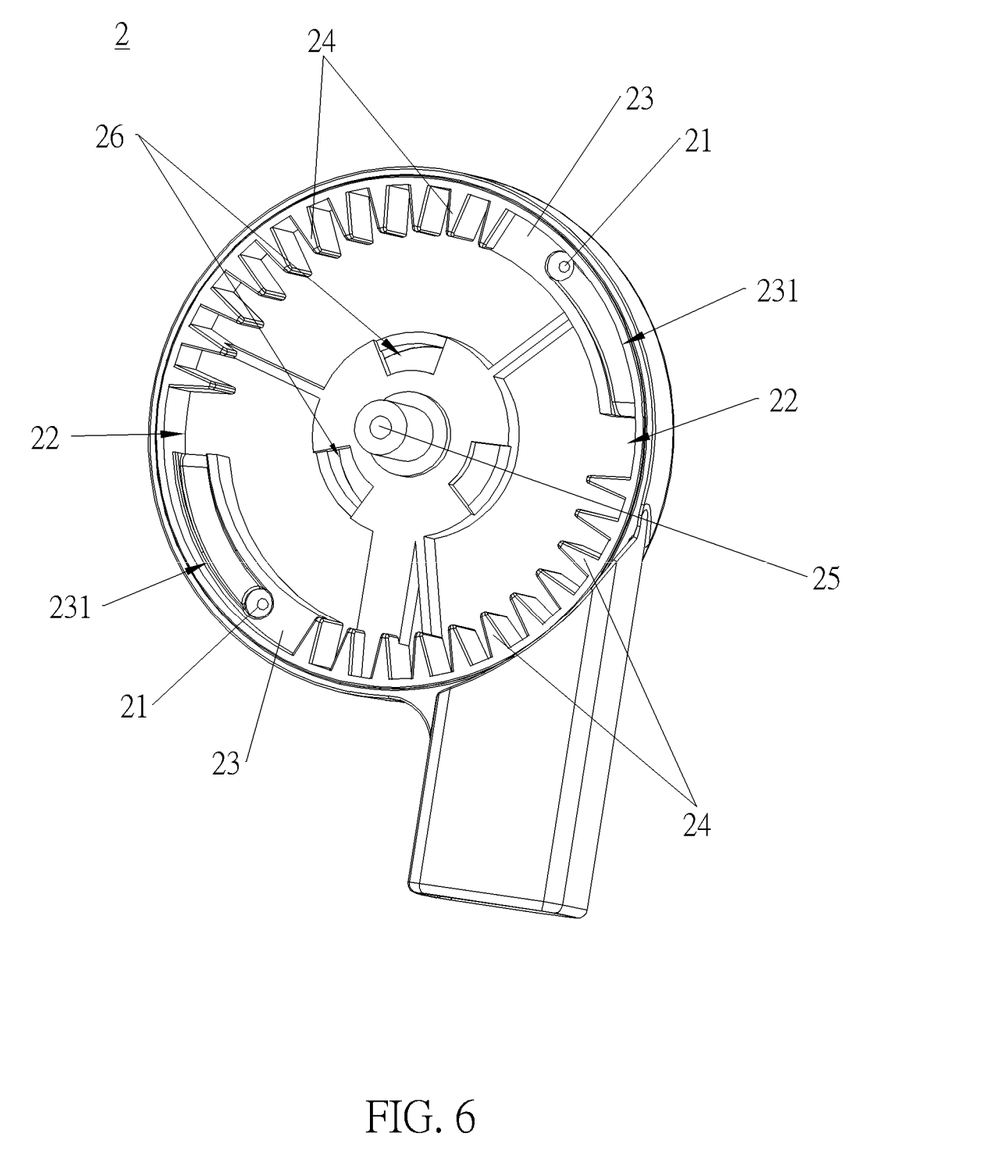
FIG. 6 is an enlarged diagram of the second mount in FIG. 2.
Figure 7:
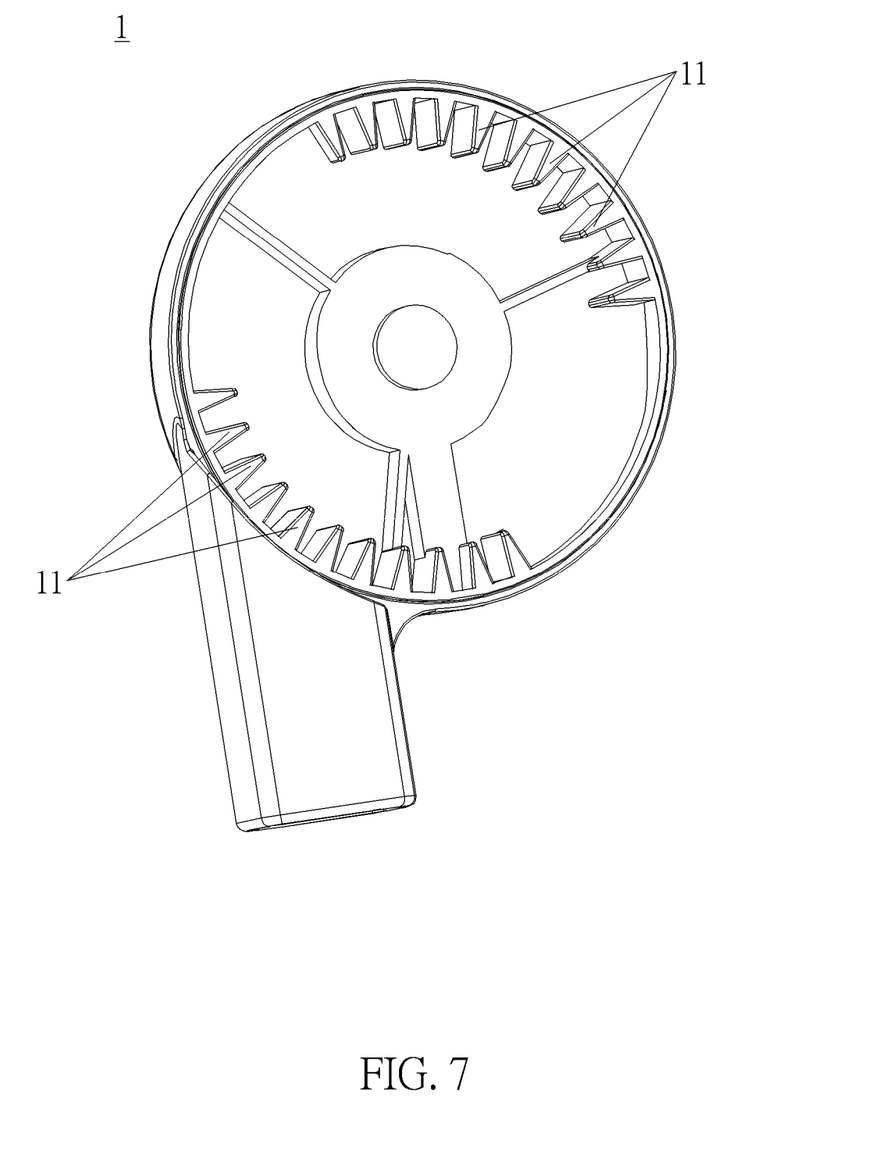
FIG. 7 is an enlarged diagram of the first mount in FIG. 2.

Please refer to FIGS. 2-4. When the first mount 1 rotates to a first rotating position relative to the second mount 2, the infant carrier 100 can be locked in a folded state. The locking member 3 has a positioning portion 31, and the second mount 2 has a mating portion 21 (i.e. the first mating portion). The positioning portion 31 can be engaged with or disengaged from the mating portion 21 with movement of the locking member 3, so as to release the first mount 1 or lock the first mount 1 at the first rotating position (as shown in FIG. 4). There are at least two positioning portions 31 and at least two mating portions 21 in a symmetrical arrangement (two positioning portions 31 and two mating portions 21 shown in this embodiment, but not limited thereto). When the first mount 1 rotates relative to the second mount 2, the first mount 1 drives the locking member 3 to rotate relative to the second mount 2 about the rotating axis. When the first mount 1 rotates to the first rotating position relative to the second mount 2, the locking member 3 approaches the second mount 2 along the axial direction of the rotating axis to make the positioning portion 31 of the locking member 3 engaged with the mating portion 21 of the second mount 2, so as to lock the first mount 1 at the first rotating position via the locking member 3. In such a manner, the front leg 101 and the rear leg 102 of the infant carrier 100 can be locked at a folded position via structural engagement of the positioning portion 31 and the mating portion 21, so as to efficiently prevent the front leg 101 and the rear leg 102 from accidental expansion during the transportation or placement process. When the locking member 3 moves away from the second mount 2 along the axial direction of the rotating axis, the positioning portion 31 of the locking member 3 is disengaged from the mating portion 21 of the second mount 2 to release the locking member 3, so that the first mount 1 can rotate freely relative to the second mount 2. For example, one of the positioning portion 31 and the mating portion 21 is a convex cylindrical structure, and the other of the positioning portion 31 and the mating portion 21 is a concave cylindrical structure.

In this embodiment, the positioning portion 31 is a convex cylindrical structure and the mating portion 21 is a concave cylindrical structure, but not limited thereto. To be noted, the front leg 101 and the rear leg 102 can be locked in the folded state via engagement of the positioning portion 31 and the mating portion 21. If the height of the positioning portion 31 is higher and the depth of the mating portion 21 is deeper, it is necessary to utilize a release button 4 to disengage the positioning portion 31 of the locking member 3 from the mating portion 21 of the second mount 2 for releasing the first mount 1 and the second mount 2. In this embodiment, since the height of the positioning portion 31 is lower and the depth of the mating portion 21 is shallower, the present invention can not only make the leg 101 and the rear leg 102 locked in the folded state steadily via engagement of the positioning portion 31 and the mating portion 21, but can also allow that the positioning portion 31 of the locking member 3 can be disengaged from the mating portion 21 of the second mount 2 by a manual pulling operation when releasing the first mount 1 and the second mount 2 (but not limited thereto, meaning that the positioning portion 31 of the locking member 3 can also be disengaged from the mating portion 21 of the second mount 2 by pressing the release button 4). In summary, there are two ways to release the locking member 3, so as to improve the operational convenience of the infant carrier 100.

Please refer to FIGS. 3-6. When the first mount 1 rotates to a second rotating position relative to the second mount 2, the infant carrier 100 can be locked in an expanded state. The locking member 3 has a locking portion 32, and the second mount 2 has a mating portion 22 (i.e. the second mating portion) mating with the locking portion 32. The mating portion 21 and the mating portion 22 are spaced apart from each other. The locking portion 32 can be engaged with or disengaged from the mating portion 22 with movement of the locking member 3, so as to release the first mount 1 or lock the first mount 1 at the second rotating position (as shown in FIG. 3). There are at least two locking portions 32 and at least two mating portions 22 in a symmetrical arrangement (two locking portions 32 and two mating portions 22 shown in this embodiment, but not limited thereto).

When the first mount 1 rotates relative to the second mount 2, the first mount 1 drives the locking member 3 to rotate relative to the second mount 2 about the rotating axis. When the first mount 1 rotates to the second rotating position relative to the second mount 2, the locking member 3 approaches the second mount 2 along the axial direction of the rotating axis, so as to make the locking portion 32 of the locking member 3 engaged with the mating portion 22 of the second mount 2. As such, the first mount 1 can be locked at the second rotating position via the locking member 3. When the locking member 3 moves away from the second mount 2 along the axial direction of the rotating axis, the locking portion 32 of the locking member 3 is disengaged from the mating portion 22 of the second mount 2 to release the locking member 3, so that the first mount 1 can rotate freely relative to the second mount 2. For example, the locking portion 32 is a limiting block protruding from the locking member 3 toward the second mount 2, and the mating portion 22 is a limiting slot mating with the limiting block. Accordingly, the first mount 1 can be locked at the second rotating position via engagement of the locking portion 32 and the mating portion 22.

As shown in FIGS. 3-6, the second mount 2 further includes a protrusion 23 adjacent to the mating portion 22. The protrusion 23 protrudes from the second mount 2 toward the first mount 1, and a guide slot 231 is formed on the protrusion 23 for the positioning portion 31 to slide therein. The mating portion 22 is disposed at an end of the guide slot 231, and the guide slot 231 is communicated with the limiting slot (i.e. the mating portion 22). The mating portion 21 is disposed at the other end of the guide slot 231. There is a height difference between the protrusion 23 and the limiting slot, so as to make the limiting block engaged with the limiting slot steadily. There are at least two protrusions 23 in a symmetrical arrangement. In this embodiment, two protrusions 23 are disposed symmetrically on the second mount 2, but not limited thereto. Since the guide slot 231 is communicated with the limiting slot, the positioning portion 31 can slide along the guide slot 231 to be engaged with the mating portion 21 when the limiting block and the positioning portion 31 on the limiting block are disengaged from the limiting slot. On the contrary, after the positioning portion 31 is disengaged from the mating portion 21, the limiting block can slide to be engaged with the limiting slot via sliding of the positioning portion 31 along the guide slot 231. Preferably, the guide slot 231 is arc-shaped, but not limited thereto. It could be understood that the locking portion 32 and the mating portion 22 are omissible components in another embodiment, meaning that there is no second rotating position. To be noted, in another embodiment, the present invention could adopt the design that the first mount 1 can be rotatable to a third rotating position, a fourth position, or a fifth position (but not limited thereto).

As shown in FIGS. 3-4, the foldable mechanism 200 further includes the release button 4 and an elastic member 5. The release button 4 is slidably disposed on the second mount 2 and is connected to the locking member 3. As such, the locking member 3 can be locked or released via sliding of the release button 4 on the second mount 2. The elastic member 5 is disposed between the first mount 1 and the locking member 3. The elastic member 5 biases the locking member 3 against the second mount 2 and abuts the locking member 3 against the release button 4 elastically. In such a manner, when the first mount 1 is located at the first rotating position, the elastic member biases the positioning portion 31 of the locking member 3 to be engaged with the mating portion 21 of the second mount 2, so as to lock the first mount 1 at the first rotating position. When the first mount 1 is located at the second rotating position, the elastic member biases the locking portion 32 of the locking member 3 to be engaged with the mating portion 22 of the second mount 2, so as to lock the second mount 2 at the second rotating position. On the other hand, the release button 4 can drive the locking member 3 to overcome elastic force of the elastic member 5 to slide away from the second mount 2, so as to disengage the locking portion 32 of the locking member 3 from the mating portion 22 of the second mount 2. As such, the locking member 3 can be released to make the first mount 1 rotatable freely relative to the second mount 2. Specifically, the release button 4 includes a button body 41 and an abutting portion 42. The abutting portion 42 extends from the button body 41 toward the locking member 3. The abutting portion 42 is slidably disposed through the second mount 2 to abut against the locking member 3. In such a manner, an external force can be exerted upon the button body 42 conveniently to move the locking member 3 via the abutting portion 42, so as to make the foldable mechanism 200 have a simple button design and improve the operational convenience of the foldable mechanism 200. Preferably, the abutting portions 42 are disposed around a periphery of the button body 42, and each abutting portion 42 bends outwardly to form a blocking portion 421. A limiting hole 26 is formed on the second mount 2 for constraining movement of the blocking portion 421. Via the simple design of utilizing the limiting hole 26 to constrain movement of the blocking portion 421, a sliding distance of the release button 4 can be adjusted flexibly. The elastic member 5 is disposed between the first mount 1 and the locking member 3 and is in a compressed state. Via the simple design that the elastic member 5 biases the locking member 3 against the second mount and abuts the locking member 3 against the release button 4 elastically, it is convenient to move the locking member 3 elastically between the first mount 1 and the second mount 2. The first mount 1 could have a containing cavity formed therein for containing the elastic member 5, so that the elastic member 5 can provide a more stable elastic force to the locking member 3. Preferably, the elastic member 5 is a compressed spring, but not limited thereto.

Please refer to FIGS. 4-7. The locking member 3 further has engaging teeth 33. The first mount 1 has first teeth 11 mating with the engaging teeth 33, and the second mount 2 has second teeth 24 mating with the engaging teeth 33. When the first mount 1 is locked relative to the second mount 2, the elastic member 5 drives the engaging teeth 33 to be engaged with the first teeth 11 and the second teeth 24 simultaneously. When the first mount 1 is released relative to the second mount 2, the engaging teeth 33 are disengaged from the second teeth 24. The engaging teeth 33 can be driven by the release button 4 to overcome the elastic force of the elastic member 5 and then be disengaged from the second teeth 24.

That is, when the first mount 1 is locked at the first rotating position and the engaging teeth 33 are engaged with the first teeth 11 and the second teeth 24 simultaneously, the first mount 1 is unable to rotate relative to the second mount 2 due to engagement of the engaging teeth 33 with the first teeth 11 and the second teeth 24. The aforesaid tooth engaging design not only guides the locking portion 32 to be engaged with the mating portion 22 smoothly, but also improves the locking stability between the first mount 1 and the second mount 2. When the release button 4 pushes the engaging teeth 33 of the locking member 3 to overcome the elastic force of the elastic member 5 for making the engaging teeth 33 disengaged from the second teeth 24 and engaged with the first teeth 11, the first mount 1 can rotate relative to the second mount 2 since the engaging teeth 33 no longer constrains movement of the second teeth 24 relative to the first teeth 11 and the locking portion 32 is disengaged from the mating portion 22. Accordingly, via the aforesaid simple releasing operation, the front leg 101 can rotate freely relative to the rear leg 102. Preferably, the engaging teeth 33, the first teeth 11, and the second teeth 24 are in a circle arrangement to make locking of the engaging teeth 33 more stable. The first teeth 11 are always engaged with the engaging teeth 33 to make the first mount 1 rotate together with the locking member 3.

Please refer to FIGS. 1-7. The detailed description for the operations of the infant carrier 100 having the foldable mechanism 200 is provided as follows.

When the main frame 10 is folded, the front leg 101 and the rear leg 102 are in a folded state (the first mount 1 is locked at the first rotating position relative to the second mount 2), the positioning portion 31 of the locking member 3 is engaged with the mating portion 21. At this time, the locking portion 32 abuts against the protrusion 23. When a user wants to expand the main frame 10, meaning that the first mount 1 needs to rotate to the second rotating position, the user just needs to expand the front leg 101 and the rear leg 102 manually, so as to disengage the positioning portion 31 of the locking member 3 from the mating portion 21 of the second mount 2 for releasing the first mount 1. Subsequently, the front leg 101 can be rotated relative to the rear leg 102 to make the first mount 1 rotate relative to the second mount 2. With rotation of the first mount 1, the positioning portion 31 of the locking member 3 can slide along the guide slot 231 to make the locking portion 32 of the locking member 3 slide toward the mating portion 22. During this process, the engaging teeth 33 of the locking member 3 are separate from the second teeth 24, and the elastic member 5 is in a compressed state. When the locking portion 32 slides to be aligned with the mating portion 22, the elastic member 5 can drive the locking portion 32 to be engaged with the mating portion 22. At the same time, the elastic member 5 drives the engaging teeth 33 of the locking member 3 to be engaged with the first teeth 11 and the second teeth 24 simultaneously. In such a manner, the locking member 3 can lock the first mount 1 at the second rotating position for completing the expanding operation of the main frame 10.

When the main frame 10 is expanded, the front leg 101 and the rear leg 102 are in an expanded state (the first mount 1 is locked at the second rotating position relative to the second mount 2), the engaging teeth 33 of the locking member 3 are engaged with the first teeth 11 and the second teeth 24 simultaneously, and the locking portion 32 of the locking member 3 is engaged with the mating portion 22, which means that the limiting block is located in the limiting slot. When the user wants to fold the main frame 10, meaning that the first mount 1 needs to rotate to the first rotating position, the user just needs to press the release button 4 for driving the locking member 3 to overcome the elastic force of the elastic member 5 and then slide away from the second mount 2. During this process, the limiting block can be disengaged from the limiting slot and the engaging teeth 33 of the locking member 3 can be disengaged from the second teeth 24, so as to release the first mount 1. Subsequently, the front leg 101 can be rotated relative to the rear leg 102 to make the first mount 1 rotate relative to the second mount 2. With rotation of the first mount 1, the positioning portion 31 of the locking member 3 can slide toward the mating portion 21 along the guide slot 231, and the elastic member 5 can drive the locking member 3 to slide toward the second mount 2, so as to make the positioning portion 31 engaged with the mating portion 21. In such a manner, the locking member 3 can lock the first mount 1 at the first rotating position for completing the folding operation of the main frame 10.

As shown in FIGS. 1-7, since the foldable mechanism 200 of the present invention includes the first mount 1, the second mount 2 and the locking member 3, the first mount 1 is pivotally connected to the second mount 2, and the locking member 3 rotates together with the first mount 1, rotation of the first mount 1 relative to the second mount 2 can drive the locking member 3 to rotate relative to the second mount 2. In other words, the locking member 3 can lock the first mount 1 on the second mount 2. Furthermore, via the design that the locking member 3 is movably disposed between the first mount 1 and the second mount 2, the first mount 1 can be locked at the first rotating position relative to the second mount 2 for locking the infant carrier 100 in the folded state, or can be locked at the second rotating position for locking the infant carrier 100 in the expanded state. Free rotation of the locking member 3 about the rotating axis relative to the second mount 2 can make the first mount 1 rotatable relative to the second mount 2 for adjusting a rotating position of the first mount 1 relative to the second mount 2. Moreover, the locking member 3 can move along the axial direction of the rotating axis to be engaged with the second mount 2 for locking rotation of the locking member 3, so as to indirectly lock the first mount 1 at the first rotating position or the second rotating position. In such a manner, the infant carrier 100 can be locked in the folded or expanded state via rotation and axial movement of the locking member 3, so as to make the foldable mechanism 200 have a simple mechanical design and improve folding stability of the foldable mechanism 200.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A foldable mechanism applied to locking an infant carrier in a folded state or an expanded state, the foldable mechanism comprising:
   a first mount;
   a second mount pivotally connected to the first mount, the second mount having a first mating portion and a second mating portion spaced apart from the first mating portion; and
   a locking member movably disposed between the first mount and the second mount, the locking member being movable along an axial direction of a rotating axis of the first mount and the second mount to lock and release rotation of the first mount relative to the second mount, the locking member having a positioning portion and a locking portion, the first mount being locked at a first rotating position or a second rotating position via movement of the locking member;

wherein the positioning portion has a first shape complementary to the first mating portion so as to be engaged with the first mating portion to lock the first mount at the first rotating position, and the positioning portion is disengaged from the first mating portion to release the first mount;

wherein the locking portion has a second shape complementary to the second mating portion so as to be engaged with the second mating portion to lock the first mount at the second rotating position, and the locking portion is disengaged from the second mating portion to release the first mount; and wherein the first shape of the positioning portion is not complementary to the second mating portion and the second shape of the locking portion is not complementary to the first mating portion.

2. The foldable mechanism of claim 1, wherein the locking portion is a limiting block protruding from the locking member toward the second mount, the second mating portion is a limiting slot mating with the limiting block, and the positioning portion is formed on the limiting block.

3. The foldable mechanism of claim 1, wherein the second mount further comprises a protrusion adjacent to the second mating portion, a guide slot is formed on the protrusion, the positioning portion is slidable along the guide slot, the second mating portion is disposed at one end of the guide slot, and the first mating portion is disposed at the other end of the guide slot.

4. The foldable mechanism of claim 3, wherein the protrusion protrudes from the second mount toward the first mount.

5. The foldable mechanism of claim 1, wherein one of the positioning portion and the first mating portion is a convex structure, and the other of the positioning portion and the first mating portion is a concave structure.

6. The foldable mechanism of claim 1, wherein the foldable mechanism further comprises a release button slidably disposed on the second mount and connected to the locking member, and sliding of the release button on the second mount locks or releases the locking member.

7. The foldable mechanism of claim 6, wherein the foldable mechanism further comprises an elastic member disposed between the first mount and the locking member, and the elastic member biases the locking member against the second mount and abuts the locking member against the release button.

8. The foldable mechanism of claim 6, wherein the release button comprises a button body and an abutting portion, the abutting portion extends from the button body toward the locking member, and the abutting portion is disposed through the second mount to abut against the locking member.

9. The foldable mechanism of claim 1, wherein the locking member further has engaging teeth, the first mount has first teeth mating with the engaging teeth, the second mount has second teeth mating with the engaging teeth, the engaging teeth are engaged with the first teeth and the second teeth when the first mount is locked relative to the second mount, and the engaging teeth are disengaged from the second teeth when the first mount is released relative to the second mount.

10. The foldable mechanism of claim 1, wherein the second mount has a sliding shaft extending toward the first mount, and the locking member has a center hole slidably mating with the sliding shaft.

11. An infant carrier comprising:
a main frame comprising a front leg and a rear leg;
a seat mounted on the main frame; and
a foldable mechanism comprising:
a first mount connected to one of the front leg and the rear leg;
a second mount connected to the other of the front leg and the rear leg and pivotally connected to the first mount to make the front leg pivotally connected to the rear leg, the second mount having a first mating portion and a second mating portion spaced apart from the first mating portion; and
a locking member movably disposed between the first mount and the second mount, the locking member being movable along an axial direction of a rotating axis of the first mount and the second mount to lock and release rotation of the first mount relative to the second mount, the locking member having a positioning portion and a locking portion, the first mount being locked at a first rotating position or a second rotating position via movement of the locking member;

wherein the positioning portion has a first shape complementary to the first mating portion so as to be engaged with the first mating portion to lock the first mount at the first rotating position, and the positioning portion is disengaged from the first mating portion to release the first mount;

wherein the locking portion has a second shape complementary to the second mating portion so as to be engaged with the second mating portion to lock the first mount at the second rotating position, and the locking portion is disengaged from the second mating portion to release the first mount; and wherein the first shape of the positioning portion is not complementary to the second mating portion and the second shape of the locking portion is not complementary to the first mating portion.

12. The infant carrier of claim 11, wherein the locking portion is a limiting block protruding from the locking member toward the second mount, the second mating portion is a limiting slot mating with the limiting block, and the positioning portion is formed on the limiting block.

13. The infant carrier of claim 11, wherein the second mount further comprises a protrusion adjacent to the second mating portion, a guide slot is formed on the protrusion, the positioning portion is slidable along the guide slot, the second mating portion is disposed at one end of the guide slot, and the first mating portion is disposed at the other end of the guide slot.

14. The infant carrier of claim 11, wherein one of the positioning portion and the first mating portion is a convex structure, and the other of the positioning portion and the first mating portion is a concave structure.

15. The infant carrier of claim 11, wherein the foldable mechanism further comprises a release button slidably disposed on the second mount and connected to the locking member, and sliding of the release button on the second mount locks or releases the locking member.

16. The infant carrier of claim 15, wherein the foldable mechanism further comprises an elastic member disposed between the first mount and the locking member, and the elastic member biases the locking member against the second mount and abuts the locking member against the release button.

17. The infant carrier of claim 15, wherein the release button comprises a button body and an abutting portion, the abutting portion extends from the button body toward the locking member, and the abutting portion is disposed through the second mount to abut against the locking member.

18. The infant carrier of claim 11, wherein the locking member further has engaging teeth, the first mount has first teeth mating with the engaging teeth, the second mount has second teeth mating with the engaging teeth, the engaging teeth are engaged with the first teeth and the second teeth when the first mount is locked relative to the second mount, and the engaging teeth are disengaged from the second teeth when the first mount is released relative to the second mount.

* * * * *